US005572791A

United States Patent [19]

Kojima

[11] Patent Number: 5,572,791

[45] Date of Patent: Nov. 12, 1996

[54] METHOD FOR POSITIONING A PICKUP ON AN ELECTRIC GUITAR

[76] Inventor: Kazushige Kojima, Nobakaneichi 703, 6-26, Yorikicho, Kitaku, Osaka, Japan

[21] Appl. No.: 231,351

[22] Filed: Apr. 20, 1994

Related U.S. Application Data

[62] Division of Ser. No. 533, Jan. 4, 1993, abandoned, which is a continuation of Ser. No. 807,945, Dec. 10, 1991, abandoned, which is a continuation of Ser. No. 467,101, Jan. 18, 1990, abandoned.

[30] Foreign Application Priority Data

Jan. 23, 1989 [JP] Japan .................................... 1-14659

[51] Int. Cl.[6] .................................................. B29D 17/00

[52] U.S. Cl. ........................................ 29/896.22; 84/723

[58] Field of Search .............................. 29/169.5, 896.2, 29/896.22, 832; 84/723, 726, 727, 728, 731, 733, 734

[56] References Cited

U.S. PATENT DOCUMENTS 2,606,474 8/1952 Kunz ........................................ 84/723

3,538,232 11/1970 Bachtig et al. ........................... 84/731

4,748,887 6/1988 Marshall ........................... 84/DIG. 30

4,873,904 10/1989 Norimatsu ................................ 84/727

*Primary Examiner*—P. W. Echols

*Attorney, Agent, or Firm*—Jordan and Hamburg

[57] ABSTRACT

In an electric guitar, the sound produced upon playing on a string thrown, to a predetermined tension, along and over the fingerboard between the bridge and the head is checked by ear to determine phantom semitone frets with the fingerboard extended imaginarily toward and closer to the bridge and the pickup is mounted on the body at one of the phantom semitone frets. The determination of the installation position for the pickup by reference to vibrations of the string on the basis of the above principle of phantom frets not only assures an improved reproducibility of guitar sounds but enables one to obtain nearly infinite and original sounds from the electric guitar.

4 Claims, 2 Drawing Sheets

METHOD FOR POSITIONING A PICKUP ON AN ELECTRIC GUITAR

This application is a division of application Ser. No. 08/000,533, filed Jan. 4, 1993, now abandoned, which is continuation of application Ser. No. 07/807,945, filed Dec. 10, 1991, now abandoned, which is a continuation of application Ser. No. 07/467,101, filed Jan. 18, 1990, now abandoned.

BACKGROUND OF THE INVENTION

Playing on the strings of an electric guitar causes the pickups on its body to transform the mechanical vibrations of the strings into electric signals. As these electric signals are amplified by guitar amplifiers and fed to the loudspeaker, audible sounds are produced. However, changing the installation positions of the pickups alters the harmonic overtone and, hence, causes a change in the quality of acoustic output. When, for example, a pickup is installed closer to the bridge, the output sound is shifted to the higher register of the compass to give a harder acoustic sensation. The pickup may be installed in the position where rounded or mellow notes can be obtained.

However, there has been no point of reference in determining the proper installation position for the pickup and, therefore, the problem was unavoidable that the sound of an electric guitar varies according to different installation positions of the pickup.

It is an object of the present invention to improve the reproducibility of the output tone and derive nearly infinite and original tones from an electric guitar by introducing the concept of phantom or hypothetical frets.

Other objects as well as advantageous features of the invention will become apparent from the following description taken together with the accompanying drawings.

SUMMARY OF THE INVENTION

The electric guitar of the invention, designed to accomplish the above-mentioned objects, comprises a body equipped with a bridge for securing string ends, a neck extending from the body and having a head for winding up the strings, a fingerboard carrying semitone frets is mounted on the neck and extending toward a bridge, with strings drawn to a predetermined tension over said fingerboard by means of the bridge and head, and pickups installed on the body under phantom semitone frets whose positions can be determined by extending the fingerboard imaginarily toward and close to the bridge. Since, in this electric guitar, the installation positions of pickups are determined with reference to the vibrations of a string based on the concept of phantom frets, the reproducibility of output sound is markedly improved.

A round, deep and mellow tone can be obtained from an electric guitar when the pickup is installed on the body under a phantom fret corresponding to a consonant or dissonant interval, instead of the so-called parallel keys, with respect to open string. Furthermore, particularly when a plurality of pickups are employed, nearly infinite and original musical reverberations can be obtained by installing such pickups on the body under phantom frets constituting chords or discords. It should be understood that these chords are not limited to fundamental chords, dominant chords and subdominant chords but may be other kinds of chords such as seventh and ninth chords.

For the manufacture of the electric guitar according to the invention, the body fitted with a bridge for securing the string ends in position is configured to have an extending neck terminating in a head for winding up the strings and a fingerboard carrying semitone frets is installed on the neck in the direction toward the bridge. Then, using the bridge and head, strings are drawn over the fingerboard and adjusted to a specified tension. Then, checking, by ear, the actual sound output by playing on a string, the phantom semitone fret positions obtainable by extending the fingerboard imaginarily toward and closer to the bridge are explored and pickups are mounted on the body under the phantom frets. In finding the positions of such phantom frets, harmonics can be utilized with advantage, for even if the finger-hold on the string is released, the harmonic vibrations of the string will persist to help determine the interval.

DETAILED DESCRIPTION OF THE PREFERRED EMBODIMENTS

Figure 1:
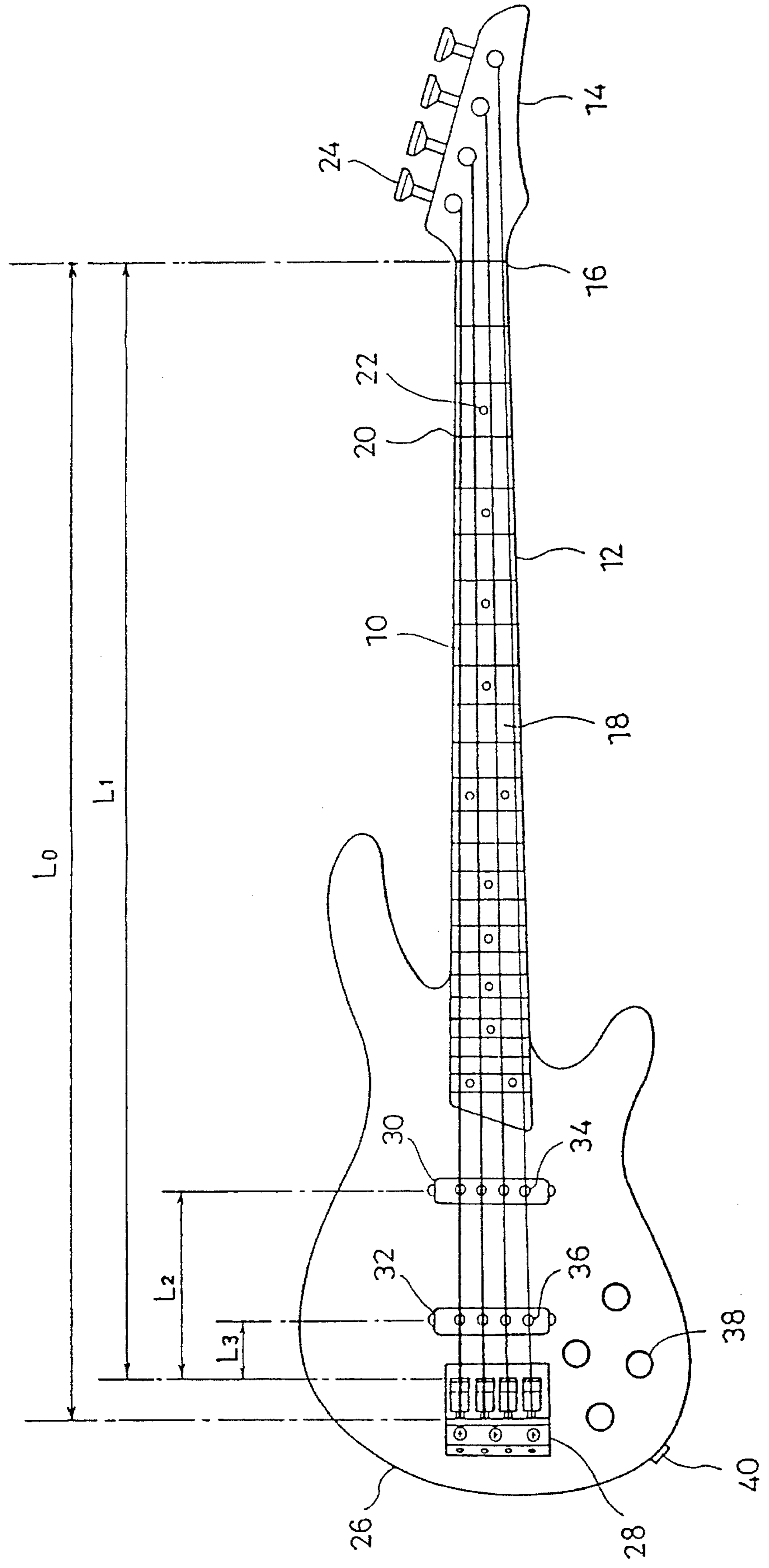
FIG. 1 is a front view showing an electric guitar according to the invention.

Referring to FIG. 1 which is a front view showing an electric guitar embodying the principle of the invention, it is a 24-fret bass guitar having four strings 10, each of which is a plated piano wire. As shown, a head 14 extends, rearward in an angular configuration, from the end of an elongated neck 12. Disposed on the borderline between the neck 12 and head 14 is a nut 16 which is grooved to prevent lateral displacement of the strings. Installed on the front side of the neck 12 is a fingerboard 18. This fingerboard 18 is fitted with 24 semitone frets, generally indicated by the reference numeral 20, and in order to assist in the identification of fret positions, position marks 22 are provided between the frets as in the prior art. The head 14 is provided with pegs 24 for taking up the respective strings at one end thereof and giving a necessary tension to each string.

The neck 12 having said head 14 extends from a body 26. Fixedly mounted on the front side of the body 26 is a bridge 28 adapted to support the strings 10 over the length of the neck 12 at the other end of each string. Thus, the other end of each string 10 drawn between the head 14 and the bridge 28 and extending along the length of the fingerboard 18 is inserted into the corresponding supporting hole in the bridge 28 and locked therein by screw means. The free-vibrating length of the string 10 is indicated by $L_1$, which is shorter than the distance $L_0$ from the position of said nut 16, viz. the position of 0 fret, to the locking position of the string at the bridge 28.

Further mounted on the front side of the body 26 are a front pickup 30 and a rear pickup 32, both of which are adapted to transform the mechanical vibrations of springs 10 into electric signals. These pickups 30,32 are disposed between the fingerboard 18 and the bridge 28 without contact with the strings 10. In this embodiment, each of said pickups 30,32 is a single coil pickup having four pole pieces 34,36 each. The installation positions for the two pickups 30,32 with respect to the direction of the strings are at the semitone phantom frets which are determined by extending the fingerboard 18 imaginarily toward and closer to the bridge 28. As will be more fully described hereinafter, these positions are explored by checking the output sound which, after a peg 24 has been wound up to keep the string 10 taut, is produced as the string 10 is actually played on. Furthermore, these pickups 30,32 are set and fixed in position so that the string 10 passes above the pole pieces 34,36. In this arrangement, the string 10 which is made of a ferromagnetic material passes through the magnetic fluxes provided by the pole pieces 34,36. Further mounted on the body 26, on its front side, are volume control knobs 38 such as a master volume, a pickup volume, etc., and, on its lateral side, an output jack 40 connected to the pickups 30,32. It should be understood that the number of single coil pickups is not limited to 2 but three or more pickups may be provided. It should also be understood that when the front pickup 30 has two pole pieces per string, the pickup 30 is fixed on the body 26 in such a position that each of the strings passes almost just over the center between the two pole pieces.

Figure 2:
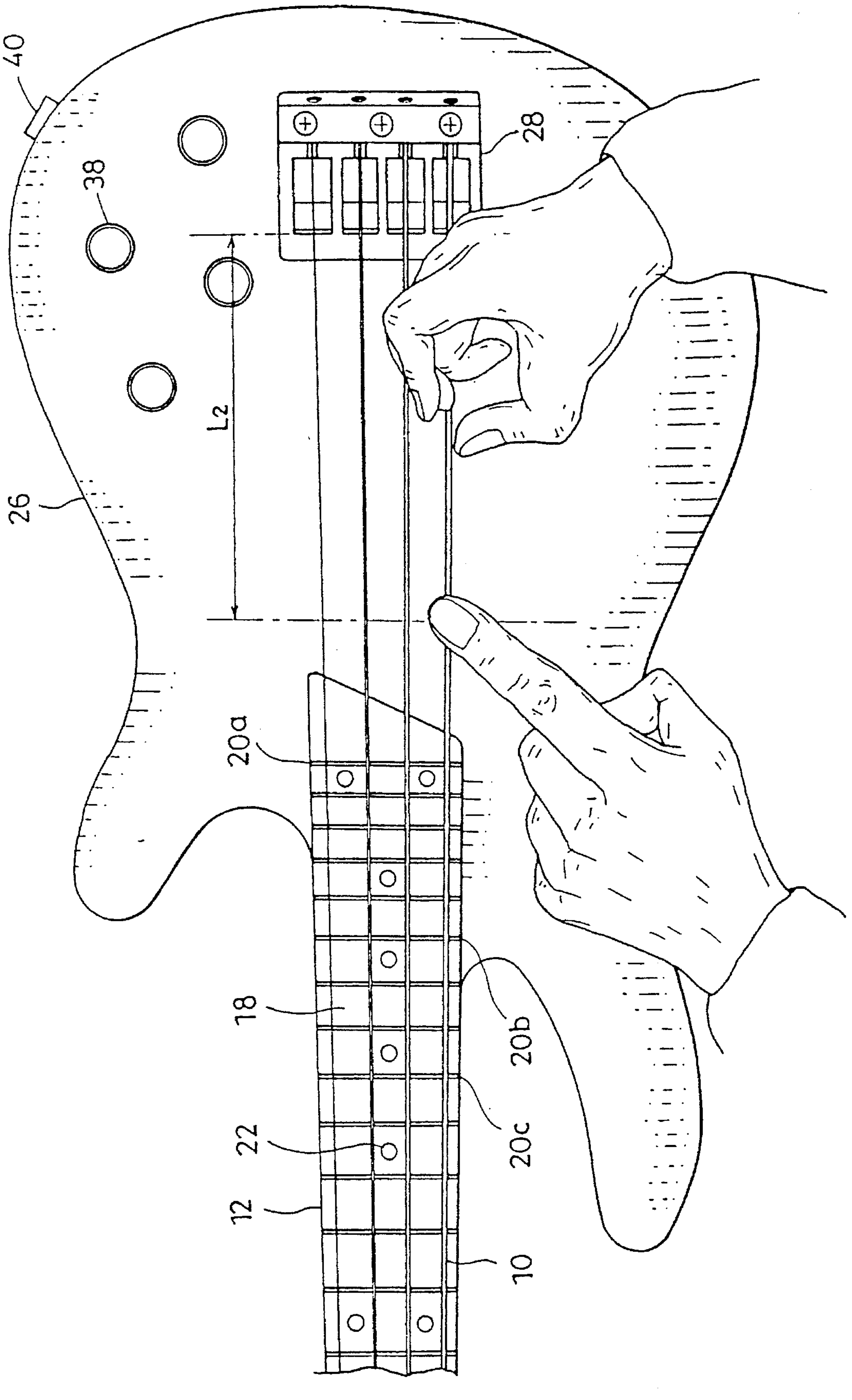
FIG. 2 is a front view on exaggerated scale which illustrates the procedure of determining the installation positions of pickups on the electric guitar shown in FIG. 1.

To determine the installation positions of the two pickups 30,32, the tension of each string 10 is properly adjusted and the following procedure, for instance, is then followed. First, referring to FIG. 2, between the 24th fret 20*a* and the bridge 28, the index finger of the left hand is set on the string 10, for example String 4. In so doing, the pressure applied to the string 10 should not be great enough to cause the string 10 to contact the frets 20. With the string 10 thus restrained against vibrating, the part of the string between this point of restraint and the bridge 28 is picked with the thumb of the right hand and the resulting sound output from the string 10 is directly checked by ear. Now, it is judged whether this sound is higher by one octave from the sound produced upon playing on the string 10 with the string pressed against the 19th fret 20*b* in the usual manner (In the case of String 4, the former is B3 and the latter is B2; refer to Table 1 showing the relationship of actual frets with the sounds of strings). If the interval is not equal to one octave, the index finger of the left hand is shifted along the string until an interval of one octave is obtained. This new position just under the index finger is the optimum position for the front pickup 30. This optimum position corresponds to the 31st phantom fret whose relationship to the sounds of each string is shown in Table 2. And the sound obtainable at this phantom fret (B in the case of String 4) is such that the interval between this sound and the sound (E in the case of String 4) produced when the total length $L_1$ of the open string is played is a consonant interval of perfect fifth. Aside from the above-mentioned interval of perfect fifth, the interval of open string may preferably be major third or perfect fourth. Thus, the distance $L_2$ from the bridge 28 to the front pickup 30 is determined on the basis of vibrations of the string 10 according to the principle of phantom frets.

The installation position of the pickup 32, that is to say the distance $L_3$ between the bridge 28 and this pickup 32, is also determined in the same manner. In this case, however, it is so arranged that the sound which is produced when, with the string 10 restrained against vibrating with the index finger of the left hand, the length of the string between this point of restraint and the bridge 28 is picked with the thumb of the right hand is higher by 3 octaves (G#5 in the same of String 4) than the sound (G#2 in the case of String 4) which is produced when the string 10 is played on with the finger set on the 16th fret 20*c* Then, the sound (G# in the case of String 4) produced upon playing on the length $L_3$ of the string 10 constitutes a consonant interval of major third with respect to the sound of open string (E in the case of String 4) and this installation position for the rear pickup 32 corresponds to the 52nd of the phantom frets. Aside from said major third, the preferred interval is perfect fourth or perfect fifth. It should be understood that, instead of the procedure described above, the installation positions for the two pickups may be determined by playing on the string with the string held in restraint with some rigid object other than a finger. Once the installation positions of pickups 30,32 have been determined for any one string in the above manner, the same relationships as described above are automatically implemented for the other strings.

As the electric guitar described above is played, the magnetic flux in the coil wound on the bobbin in each of the pickups 30,32 is altered and a current corresponding to this change flows in the coil. This delicate change of current is amplified by the guitar amplifier or amplifiers and transformed into an acoustic output. Since, in the present invention, the positions of installation of the two pickups 30,32 have been determined on the basis of string vibrations according to the principle of phantom frets, the quality of sound output from the guitar is rendered uniform. Furthermore, in the embodiment described hereinabove, it should be understood that the chords are not limited to fundamental, dominant and subdominant chords but may be any other chords such as seventh chord and ninth chord.

The use of harmonics in the exploration for phantom fret positions is advantageous for judging the interval, for the vibrations of the string will then persist even if the finger is released from the string.

By way of illustration, the position of harmonics giving a note C5 which is higher by 2 octaves than the note C3 which is produced when String 1 is set down against the 5th fret is explored by ear and this position is used for the installation of the front pickup 30. This C note constitutes a consonant interval of perfect four with respect to open-string G of String 1. In this case, the corresponding phantom fret is explored using, as a reference point, about one-quarter of the free vibration length of string 10 with an assistant holding his finger on String 1 against the fifth fret or a capotasto set at the fifth fret. This position corresponds to the 29th of the phantom frets given in Table 2.

The position of harmonics (A#5) higher by 3 octaves than the 3rd fret (A#2) of String 1, that is to say the 39th phantom fret, may be used as the installation position for the front pickup 30. In this case, the interval from the open-string G of String 1 is a consonant interval of minor third.

The position of harmonics (D#6) higher by 3 octaves than the 8th fret (D#3) of String 1, that is to say the 44th phantom fret, may be used as the installation position for the rear pickup 32. In this case, the interval from open-string G of String 1 is a chromatic interval of diminished fourth.

The present invention is applicable to any electric guitar equipped with one or more strings and the number of strings is not limited to four. Moreover, the pickup need not be of the single coil type but may be a humbucking pickup. Furthermore, it need not be an electrokinetic pickup but may be a capacitive pickup or a piezoelectric pickup.

TABLE 1

| Fret | String 4(E) | String 3(A) | String 2(D) | String 1(G) |
|---|---|---|---|---|
| 0 | E1 | A1 | D2 | G2 |
| 1 | F1 | A#1 | D#2 | G#2 |
| 2 | F#1 | B1 | E2 | A2 |
| 3 | G1 | C2 | F2 | A#2 |
| 4 | G#1 | C#2 | F#2 | B2 |
| 5 | A1 | D2 | G2 | C3 |
| 6 | A#1 | D#2 | G#2 | C#3 |

TABLE 1-continued

| Fret | String 4(E) | String 3(A) | String 2(D) | String 1(G) |
|---|---|---|---|---|
| 7 | B1 | E2 | A2 | D3 |
| 8 | C2 | F2 | A#2 | D#3 |
| 9 | C#2 | F#2 | B2 | E3 |
| 10 | D2 | G2 | C3 | F3 |
| 11 | D#2 | G#2 | C#3 | F#3 |
| 12 | E2 | A2 | D3 | G3 |
| 13 | F2 | A#2 | D#3 | G#3 |
| 14 | F#2 | B2 | E3 | A3 |
| 15 | G2 | C3 | F3 | A#3 |
| 16 | G#2 | C#3 | F#3 | B3 |
| 17 | A2 | D3 | G3 | C4 |
| 18 | A#2 | D#3 | G#3 | C#4 |
| 19 | B2 | E3 | A3 | D4 |
| 20 | C3 | F3 | A#3 | D#4 |
| 21 | C#3 | F#3 | B3 | E4 |
| 22 | D3 | G3 | C4 | F4 |
| 23 | D#3 | G#3 | C#4 | F#4 |
| 24 | E3 | A3 | D4 | G4 |

TABLE 2

| Fret | String 4(E) | String 3(A) | String 2(D) | String 1(G) |
|---|---|---|---|---|
| 25 | F3 | A#3 | D#4 | G#4 |
| 26 | F#3 | B3 | E4 | A4 |
| 27 | G3 | C4 | F4 | A#4 |
| 28 | G#3 | C#4 | F#4 | B4 |
| 29 | A3 | D4 | G4 | C5 |
| 30 | A#3 | D#4 | G#4 | C#5 |
| 31 | B3 | E4 | A4 | D5 |
| 32 | C4 | F4 | A#4 | D#5 |
| 33 | C#4 | F#4 | B4 | E5 |
| 34 | D4 | G4 | C5 | F5 |
| 35 | D#4 | G#4 | C#5 | F#5 |
| 36 | E4 | A4 | D5 | G5 |
| 37 | F4 | A#4 | D#5 | G#5 |
| 38 | F#4 | B4 | E5 | A5 |
| 39 | G4 | C5 | F5 | A#5 |
| 40 | G#4 | C#5 | F#5 | B5 |
| 41 | A4 | D5 | G5 | C6 |
| 42 | A#4 | D#5 | G#5 | C#6 |
| 43 | B4 | E5 | A5 | D6 |
| 44 | C5 | F5 | A#5 | D#6 |
| 45 | C#5 | F#5 | B5 | E6 |
| 46 | D5 | G5 | C6 | F6 |
| 47 | D#5 | G#5 | C#6 | F#6 |
| 48 | E5 | A5 | D6 | G6 |

What is claimed is:

1. A method of positioning a pickup on an electric guitar having an elongated neck terminating in a head for accepting and winding up one end of at least one string, a body joined to said neck; a bridge fixed upon said body for securing another end of said at least one string in position to draw the string along and over a fingerboard with semitone frets installed on said neck; and said string being tuned to a predetermined note in an open state; said method comprising the step of:

locating the positions of phantom semitone frets by:

inhibiting vibration of said at least one string at a first position between the elongated neck and said bridge;

playing said at least one string at a second position between said first position and said bridge to emit an audible tone;

determining whether said audible tone corresponds to a predetermined phantom fret; and varying said first position until said audible tone corresponds to said predetermined phantom fret; and mounting said pickup on said body under said at least one string at said first position corresponding to said predetermined phantom fret.

2. The method of assembling an electric guitar as claimed in claim 1 wherein said phantom fret is determined by checking harmonics with relation to a tone produced by said at least one string being played in an open state.

3. A method for positioning an electric guitar pickup on an electric guitar having a body, a neck extending from said body and terminating in a head, said neck having a series of 1st through nth semitone frets, a bridge mounted on said body, and tuned strings installed between said head and bridge, said method comprising the steps of:

inhibiting vibration of one of said strings at a position between the nth semitone fret and the bridge;

playing said one string to induce vibration between said position and said bridge and thereby emit an audible tone;

varying said position while playing said one of said strings between said position and said bridge until said audible tone corresponds to a predetermined conventional semitone sound relationship to a sound resulting when playing said one of said strings as an open string; and installing a pickup on said body beneath said position on said string.

4. The method of claim 3, wherein said predetermined conventional sound relationship is a consonant interval selected from the group consisting of major third, perfect fourth and perfect fifth.

* * * * *